US010681625B1

(12) United States Patent
Jiang et al.

(10) Patent No.: US 10,681,625 B1
(45) Date of Patent: *Jun. 9, 2020

(54) SINGLE-USER ACKNOWLEDGEMENT OPTIONS FOR WIRELESS COMMUNICATION IN A MULTI-USER ENVIRONMENT

(71) Applicant: Marvell International Ltd., Hamilton (BM)

(72) Inventors: Jinjing Jiang, San Jose, CA (US); Liwen Chu, San Ramon, CA (US); Lei Wang, San Diego, CA (US); Yakun Sun, San Jose, CA (US); Hongyuan Zhang, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 16/241,881

(22) Filed: Jan. 7, 2019

Related U.S. Application Data

(63) Continuation of application No. 15/374,844, filed on Dec. 9, 2016, now Pat. No. 10,194,385.

(Continued)

(51) Int. Cl.
*H04L 5/00* (2006.01)
*H04W 48/18* (2009.01)
(Continued)

(52) U.S. Cl.
CPC .......... *H04W 48/18* (2013.01); *H04B 7/0452* (2013.01); *H04L 1/1861* (2013.01); *H04L 5/0007* (2013.01); *H04L 5/0051* (2013.01); *H04L 5/0053* (2013.01); *H04L 5/0055* (2013.01); *H04W 48/10* (2013.01);
(Continued)

(58) Field of Classification Search
CPC . H04L 1/1861; H04L 47/2466; H04L 47/827; H04L 5/0055; H04W 52/14; H04W 72/1268
See application file for complete search history.

(56) References Cited

U.S. PATENT DOCUMENTS 9,641,234 B2   5/2017 Moon et al.
9,832,792 B2   11/2017 Ghosh et al.
(Continued)

OTHER PUBLICATIONS

"Corrected Notice of Allowance", U.S. Appl. No. 15/374,066, dated Jun. 28, 2018, 7 pages.

(Continued)

*Primary Examiner* — Salvador E Rivas (57) ABSTRACT

In aspects of acknowledgement options for downlink multi-user transmission, a wireless network system includes an access point that can communicate a downlink multi-user transmission soliciting acknowledgement from one or more station devices. The access point can receive an association request or an operation mode change request frame from one or more of the station devices, and determine an acknowledgement option for each of the station devices that communicate the request to the access point. The access point can then use a multi-user transmission mode or a single user transmission mode for each of the station devices based on the acknowledgement option determined for each of the respective station devices.

20 Claims, 8 Drawing Sheets

Related U.S. Application Data (60) Provisional application No. 62/268,063, filed on Dec. 16, 2015.

(51) Int. Cl.
*H04B 7/0452* (2017.01)
*H04W 72/04* (2009.01)
*H04W 48/10* (2009.01)
*H04L 1/18* (2006.01)
*H04W 88/08* (2009.01)
*H04L 29/08* (2006.01)
*H04L 12/911* (2013.01)

(52) U.S. Cl.
CPC ......... *H04W 72/044* (2013.01); *H04L 47/827* (2013.01); *H04L 69/322* (2013.01); *H04W 88/08* (2013.01)

(56) References Cited

U.S. PATENT DOCUMENTS

| | | | |
|---|---|---|---|
| 10,194,385 B1* | 1/2019 | Jiang | H04L 5/0055 |
| 2011/0305176 A1 | 12/2011 | Wentink | |
| 2013/0279405 A1 | 10/2013 | Jafarian et al. | |
| 2013/0329620 A1 | 12/2013 | Kim et al. | |
| 2014/0211674 A1 | 7/2014 | Hiremath | |
| 2015/0063190 A1 | 3/2015 | Merlin et al. | |
| 2015/0124690 A1 | 5/2015 | Merlin et al. | |
| 2016/0128057 A1* | 5/2016 | Seok | H04L 5/0055 370/329 |
| 2016/0165589 A1 | 6/2016 | Chu et al. | |
| 2016/0242177 A1 | 8/2016 | Seok | |
| 2018/0212738 A1* | 7/2018 | Chun | H04L 27/26 |

OTHER PUBLICATIONS

"First Action Interview Office Action", U.S. Appl. No. 15/374,844, dated May 31, 2018, 9 pages.

"Notice of Allowance", U.S. Appl. No. 15/374,066, dated Mar. 26, 2018, 10 pages.

"Notice of Allowance", U.S. Appl. No. 15/374,844, dated Sep. 17, 2018, 10 pages.

"Pre-Interview Communication", U.S. Appl. No. 15/374,844, dated Apr. 20, 2018, 9 pages.

* cited by examiner

SINGLE-USER ACKNOWLEDGEMENT OPTIONS FOR WIRELESS COMMUNICATION IN A MULTI-USER ENVIRONMENT

CROSS REFERENCE TO RELATED APPLICATIONS

This application is a continuation of and claims priority to U.S. Utility patent application Ser. No. 15/374,844 filed Dec. 9, 2016, which in turn claims priority under 35 U.S.C. § 119(e) to U.S. Provisional Patent Application Ser. No. 62/268,063 filed Dec. 16, 2015, the disclosure of which is incorporated by reference herein in its entirety.

BACKGROUND

Computing devices, such as mobile phones, tablet devices, laptop computers and any other communication-enabled devices wirelessly communicate with access points, such as implemented in a Wi-Fi network. A mobile computing device is commonly referred to as a client device or "station" in a Wi-Fi network. Generally, a station may be any portable, mobile, or fixed computing device designed to be IEEE (Institute of Electrical and Electronics Engineers) 802.11 (Wi-Fi) compliant with a media access control (MAC) and physical layer (PHY) interface for wireless communication. A station communicates with an access point that is within communication range in the Wi-Fi network.

Generally, an access point, such as may be implemented in a router device, provides network connectivity for a Wi-Fi compliant device, such as a fixed or mobile computing device. Additionally, access points typically have a greater communication range than do the stations, which may vary in power-level capabilities, some being high-end stations with more of a communication range and others being low-end stations with less of a communication range. However, all of the stations need to be able to associate and communicate with an access point to enable wireless communication on the Wi-Fi network.

An access point may implement the single user (SU) sequential polled acknowledgement technique as provided for in IEEE 802.11ac, where multiple stations that receive a downlink multi-user (DL MU) transmission from the access point respond to the access point in sequential order. For sequential acknowledgement, only one of the multiple stations that is the recipient of the DL MU PPDU (PLCP (PHY Layer Convergence Procedure) Protocol Data Unit) from the access point can solicit an acknowledgement (ACK). The data frame for one station will set its acknowledgement policy (the AMPDU (Aggregated-MAC Packet Data Unit)) as an immediate ACK while the data frames for other stations will be set as a block acknowledgement (BA) (i.e., AckPolicy "11" in QoS control field). In other words, each of the other stations will respond to a BlockACK Request (BAR) frame in sequential order.

Alternatively, an access point may implement a multi-user (MU) acknowledgement technique, such as provided for in the new IEEE 802.11ax protocol for High Efficiency WLAN (Wireless Local Area Network) (HEW). The access point can communicate a downlink high efficiency multi-user (HE MU) PPDU, soliciting an acknowledgement from multiple stations that support uplink OFDMA (Orthogonal Frequency-Division Multiple Access), such as in the new IEEE 802.11ax protocol. Communication efficiencies are improved with this association technique that provides parallel transmission for multiple stations. More than one station can solicit an immediate acknowledgement (i.e., each AMPDU has an QoS AckPolicy "01" in QoS control field), and each ACK/BA from the recipient stations is transmitted in independent resource units (RU).

SUMMARY

This Summary introduces concepts of acknowledgement options for downlink multi-user transmission, and the concepts are further described below in the Detailed Description and shown in the Figures. Accordingly, this Summary should not be considered to describe essential features nor used to limit the scope of the claimed subject matter.

In an aspect of acknowledgement options for downlink multi-user transmission, an access point is implemented for wireless communication, and includes a transmitter component that communicates a downlink multi-user transmission soliciting acknowledgement from one or more station devices. A receiver component of the access point can then receive an association request from one or more of the station devices. A management entity of the access point can determine an acknowledgement option for each of the station devices that communicate packets to the access point. The management entity can then determine a multi-user transmission mode or a single user transmission mode for each of the station devices based on the acknowledgement option determined for each of the station devices.

A method implemented by an access point in a wireless communication network is described for acknowledgement options for downlink multi-user transmission. The method includes communicating a downlink multi-user transmission soliciting acknowledgement from one or more station devices, and receiving an association request from one or more of the station devices. The method also includes determining an acknowledgement option for each of the or more station devices that communicate an association request or operation mode change request to the access point. The method further includes determining a multi-user transmission mode or a single user transmission mode for each of the station devices based on the acknowledgement option determined for each of the station devices.

In another aspect of acknowledgement options for downlink multi-user transmission, a wireless network system includes a station device that is implemented to detect a downlink multi-user transmission soliciting acknowledgement that is communicated in the wireless network system, and the station device communicates an association request to join the wireless network system. The wireless network system also includes an access point that is implemented to determine an acknowledgement option for the station device, and determine a multi-user transmission mode or a single user transmission mode for the station device based on the acknowledgement option determined for the station device.

The details of one or more implementations are set forth in the accompanying drawings and the description below. Other features and advantages will be apparent from the description and drawings.

BRIEF DESCRIPTION OF THE DRAWINGS

Details of acknowledgement options for downlink multi-user transmission are described with reference to the following Figures. The same numbers may be used throughout to reference like features and components that are shown in the Figures.

DETAILED DESCRIPTION

Techniques for acknowledgement options for downlink multi-user transmission provide a mechanism for station devices to associate and communicate with an access point using a selected option to transmit acknowledgement. In particular, the described techniques provide multiple options for acknowledgement of HE MU PPDU (high efficiency multi-user PLCP (PHY Layer Convergence Procedure) Protocol Data Unit). The multiple options to acknowledge a downlink multi-user (DL MU) transmission can be utilized for different station devices, such as when legacy polled single user (SU) acknowledgement is not an available option and for station devices that do not support uplink multi-user (UL MU) transmission.

In implementations, an access point can communicate a downlink multi-user (DL MU) transmission soliciting acknowledgement from station devices, where the DL MU transmission is communicated as a HE MU PPDU. The access point can previously receive association requests from different station devices that are within communication range of the access point and responding to the downlink multi-user (DL MU) transmission. The access point is implemented to determine an acknowledgement option for each of the station devices that communicate an association request to the access point.

The access point can then use either a multi-user transmission mode or a single user transmission mode for each of the different station devices based on the acknowledgement option determined for each of the respective station devices. For example, the access point can use the multi-user transmission mode for a station device that supports uplink multi-user (UL MU) transmission, where the multi-user transmission mode uses polled uplink single user (UL SU) transmission mode with MU BAR (multi-user block acknowledgement request) to solicit the acknowledgement in an uplink OFDMA (Orthogonal Frequency-Division Multiple Access) message. Alternatively, the access point can use the single user transmission mode for a station device that does not support uplink multi-user (UL MU) transmission, where the single user transmission mode is a polled uplink single user (UL SU) sequential transmission mode used to acknowledge the access point.

While features and concepts of acknowledgement options for downlink multi-user transmission can be implemented in any number of different devices, systems, environments, and/or configurations, aspects of acknowledgement options for downlink multi-user transmission are described in the context of the following example devices, systems, and methods.

Figure 1:
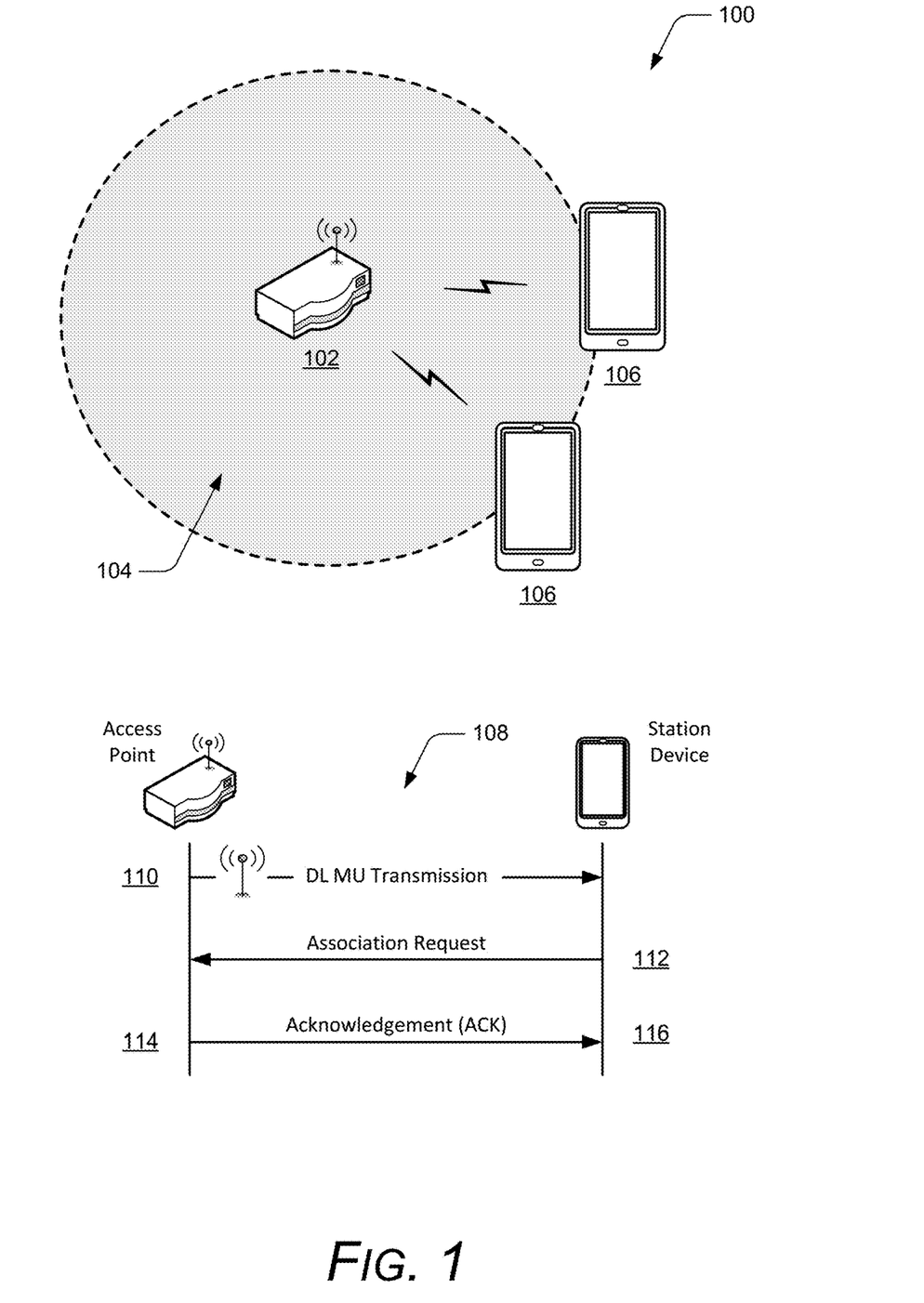
FIG. 1 illustrates an example system in which acknowledgement options for downlink multi-user transmission can be implemented.

FIG. 1 illustrates an example system 100 in which aspects of acknowledgement options for downlink multi-user transmission can be implemented. In particular, the described techniques provide options for acknowledgement of HE MU PPDU (high efficiency multi-user PLCP (PHY Layer Convergence Procedure) Protocol Data Unit). The example system 100 includes an access point 102, such as a router device implemented in a Wi-Fi network for wireless communications within a communication range 104 of the access point. Station devices 106 can associate and wirelessly communicate with the access point 102 when located within the communication range 104 of the access point. A mobile phone, tablet device, or laptop computer are examples of computing devices that may be commonly referred to as a client device or "station" in a Wi-Fi network. Generally, a station device 106 may be any IEEE (Institute of Electrical and Electronics Engineers) 802.11 (Wi-Fi) compliant portable, mobile, or fixed computing device with a media access control (MAC) and physical layer (PHY) interface for wireless communication. Although only two station devices are shown in the example system 100, any number of station devices 106 may be included in the examples and implementations described herein.

In this example system 100, the access point 102 can be implemented to support a multi-user (MU) acknowledgement association technique, such as uplink OFDMA (Orthogonal Frequency-Division Multiple Access) provided for in the new IEEE 802.11ax protocol for High Efficiency WLAN (Wireless Local Area Network) (HEW). However, some station devices 106 that associate and wirelessly communicate with the access point 102 may not support uplink multi-user (UL-MU) operation. Additionally, some of the station devices 106 may only have low-power capabilities and/or do not have enough range to communicate with the access point.

For a station device 106 that is implemented for single user (SU) sequential acknowledgement, such as provided for in IEEE 802.11ac, the current multi-user (MU) acknowledgement protocol is not changed to facilitate aspects of acknowledgement options for downlink multi-user transmission as described herein. The access point 102 can limit the use cases in which HE MU PPDU carries more than one MAC Packet Data Unit (MPDU) requesting an acknowledgement (ACK). However, as noted above for some extended range communications, a station device 106 operating in the single user (SU) mode may not have the communication range to reach the access point 102.

For a station device 106 that is implemented for immediate acknowledgement using high efficiency trigger (HE TR) PPDU, the access point 102 can schedule the uplink OFDMA transmission, and the station device 106 selects a frequency portion of the downlink frame by which to reply to the access point 102, such as a 2 MHz bandwidth of the 20 MHz downlink frame. Initially, the station device 106 can detect a downlink multi-user (DL MU) transmission communicated from the access point 102 as the 20 MHz downlink frame when the station device 106 is located within or coming into the communication range 104 of the access point. The station device 106 can detect and then randomly select the frequency portion of the downlink frame by which to reply to the access point 102, which provides an extended communication range for a low-end station device that may have less power and a limited communication range to reach the access point.

In a station device 106 implemented for immediate acknowledgement, HE MU PPDU contains multiple MPDUs intended for multiple station devices 106 that solicit for acknowledgement (ACK), but a BA (Block ACK) session has not yet been established between the access point 102 and the station devices. In implementations of the IEEE 802.11ac protocol, the access point 102 and the station devices 106 already have the BA (Block ACK) session, so the access point 102 can communicate aggregated MPDUs to a station device 106 and request a block acknowledgement. However, this may not be the implementation in the next generation protocol IEEE 802.11ax because there is a single MPDU, rather than a block acknowledgement (Block ACK) session, and the access point 102 cannot send a block acknowledgement request (BAR). The uplink multi-user (UL MU) operation is optional, but if supported by a station device 106, mandating association acknowledgement using HE TR PPDU would be the better communication protocol choice over the single user (SU) sequential acknowledgement protocol.

In a wireless network system (e.g., the example system 100), a station device 106 may not support uplink multi-user (UL MU) operation, and as noted above, a station device 106 operating in a legacy single user (SU) mode may not have the communication range to reach the access point 102. A communication sequence 108 is shown to illustrate the communications between the access point 102 and the station devices 106 in implementations of acknowledgement options for downlink multi-user transmission. Initially, the access point communicates a downlink multi-user (DL MU) transmission 110 soliciting acknowledgement from one or more of the station devices 106. A station device 106 receives the DL MU transmission 110 that is communicated from the access point 102, and can then communicate an association request 112 back to the access point. The association request 112 may be communicated in an uplink OFDMA mode to the access point 102 at the selected frequency (e.g., in the selected portion of the 20 MHz downlink frame).

The access point 102 receives the association request 112 from one or more of the station devices 106. During association, the access point 102 can determine whether a particular station device 106 can support uplink MU operation. If the station device does support uplink MU operation, then the access point 102 can schedule the acknowledgement using uplink multi-user (UL MU) OFDMA operation for the station device. If the station device 106 does not support uplink MU operation, then the access point 102 can use a polled single user (SU) operation similar to block acknowledgement request and acknowledgement response. The access point 102 can then communicate an association response 114 as an acknowledgement (ACK) 116 back to station devices 106 that have communicated an association request 112 to the access point.

During the association operation, a particular station device 106 can notify the access point 102 that it would be better to communicate with each other using a triggered uplink single user (UL SU) operation. For example, the device 106 may be within close communication range when initially connected (i.e., communicatively linked for wireless communication) with the access point 102, but then move and change transmission modes as the communication range between the two devices increases. The access point 102 can solicit ACK/BA accordingly based on the capability and operation mode of the station device 106. Accordingly, for QoS Data frames, the AckPolicy can be selected for the operation and the BA/ACK determined based on whether trigger-based UL SU mode is used. Additionally, the access point 102 can group different ones of the station devices 106 together to request acknowledgement.

Figure 2:
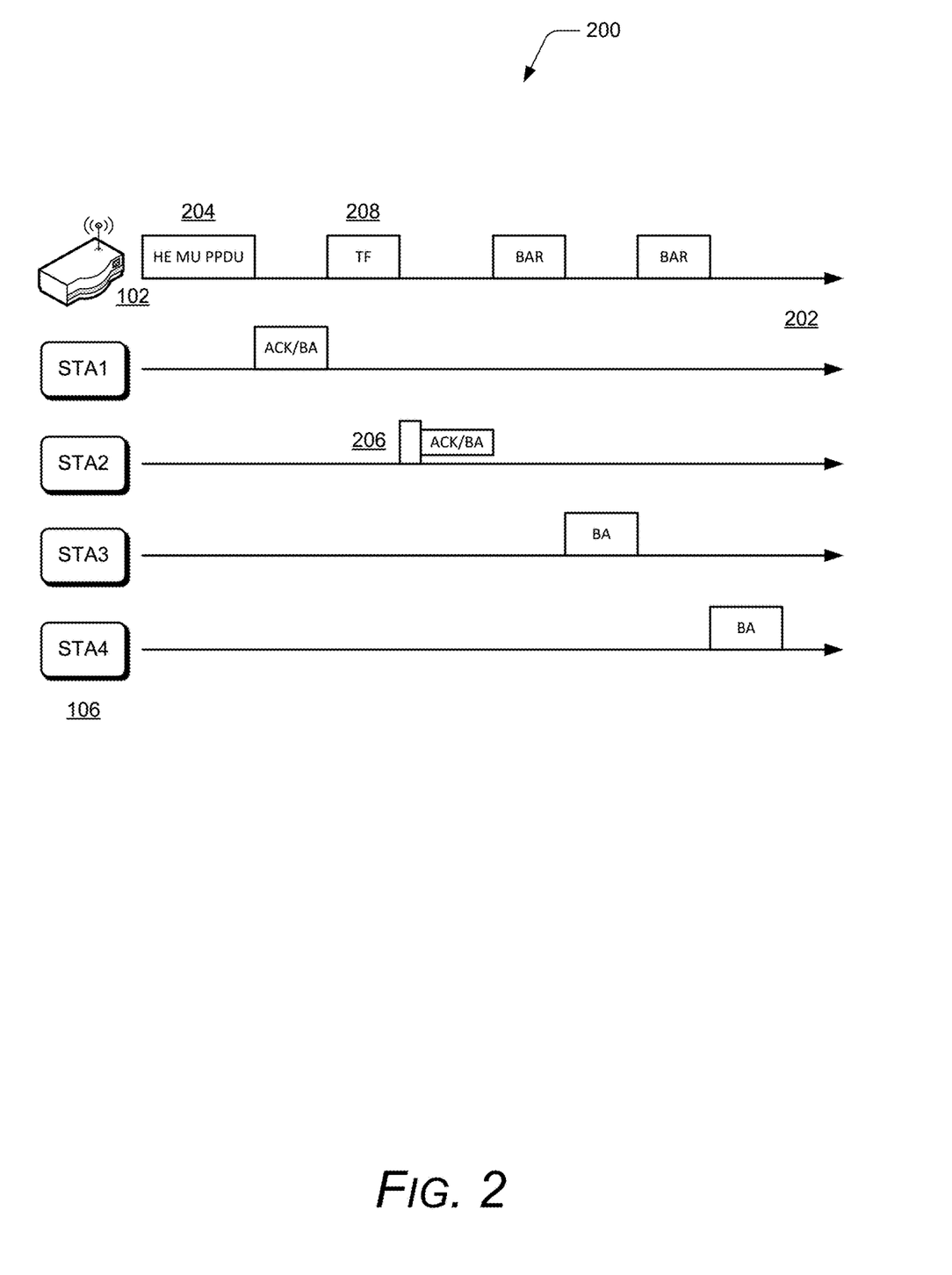
FIG. 2 illustrates an example of acknowledgement options for downlink multi-user transmission using a polled uplink single user sequential transmission mode.

FIG. 2 illustrates an example 200 of acknowledgement options for downlink multi-user transmission using a polled uplink single user sequential transmission mode. The example 200 includes a timeline 202 that shows the access point 102 implemented for HE MU PPDU 204 (high efficiency multi-user PLCP (PHY Layer Convergence Procedure) Protocol Data Unit). Three of the four different station devices 106, STA1, STA3, and STA4 do not support uplink multi-user (UL MU) transmission, in which case the polled uplink single user sequential transmission mode is used to communicate the acknowledgement 116 to the three station devices 106. As noted above, these three station devices 106 and STA2 may not have enough range to communicate with the access point 102, yet are requesting block acknowledgement (BA) using narrow band transmission. Additionally, the trigger frame (TF) 208 soliciting the ACK could be aggregated with the MPDU in HE MU PPDU 204.

Figure 3:
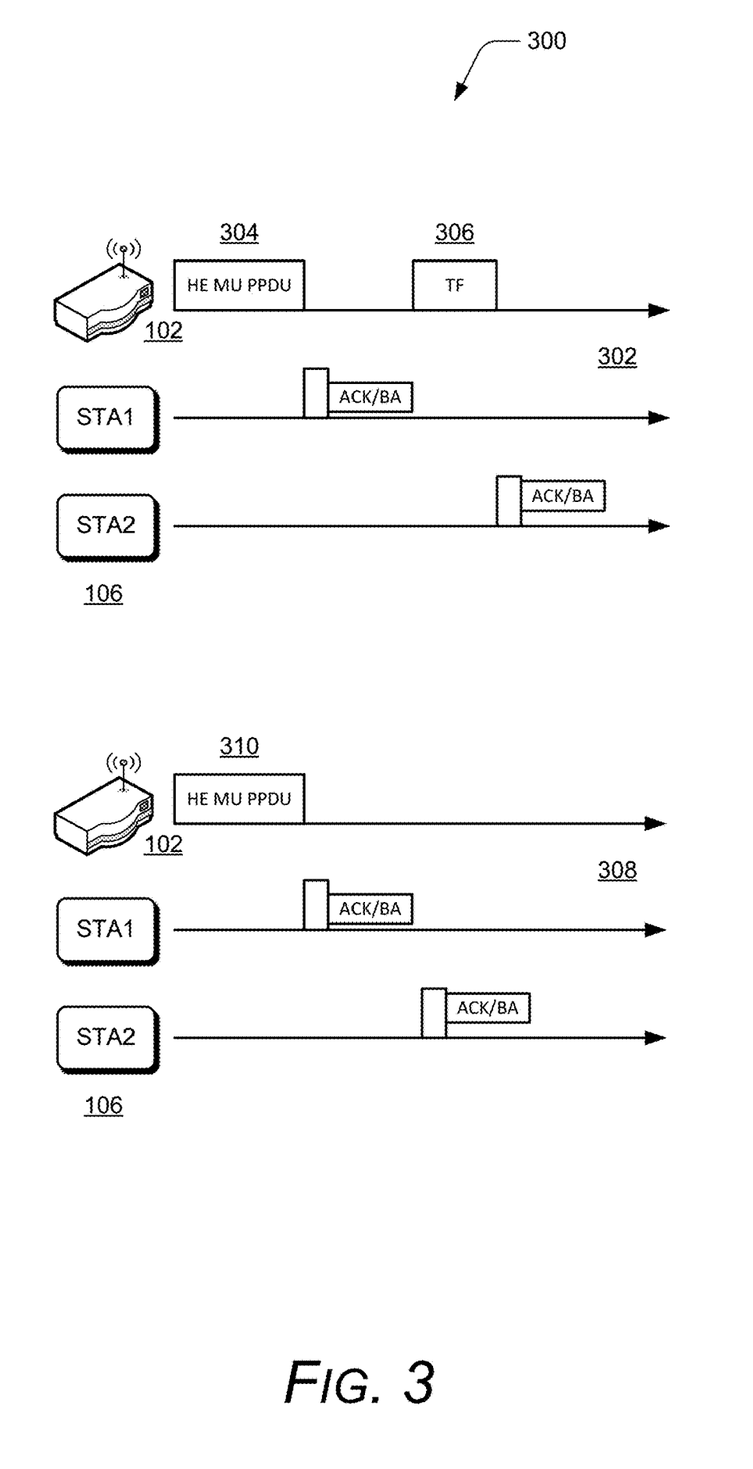
FIG. 3 illustrates an example of acknowledgement options for downlink multi-user transmission with variations on the a polled uplink single user sequential transmission mode shown in FIG. 2.

FIG. 3 illustrates examples 300 of acknowledgement options for downlink multi-user transmission with variations using the polled uplink single user sequential transmission mode shown in FIG. 2. The examples 300 include a timeline 302 that shows the access point 102 implemented for HE MU PPDU 304 and two station devices 106, STA1 and STA2 that do not support uplink multi-user (UL MU) transmission and are low-power station devices. For triggered uplink single user (UL SU) used to collect the ACK/BA, the trigger frame (TF) 306 can be transmitted after the Short Interframe Space (SIFS) time of the previous ACK/BA or HE MU PPDU. Additionally, the first trigger frame (TF) 306 may be aggregated with the MPDU(s) in HE MU PPDU 304. The examples 300 also include a timeline 308 that shows the access point 102 implemented for HE MU PPDU 310 and two station devices 106, STA1 and STA2 that do not support uplink multi-user (UL MU) transmission and are low-power station devices. In this variation, all of the trigger frames (e.g., that indicate which station device to send back an acknowledgement) for triggered UL SU can be aggregated with the MPDU(s) in HE MU PPDU, where each ACK in an UL SU will be SIFS apart.

Figure 4:
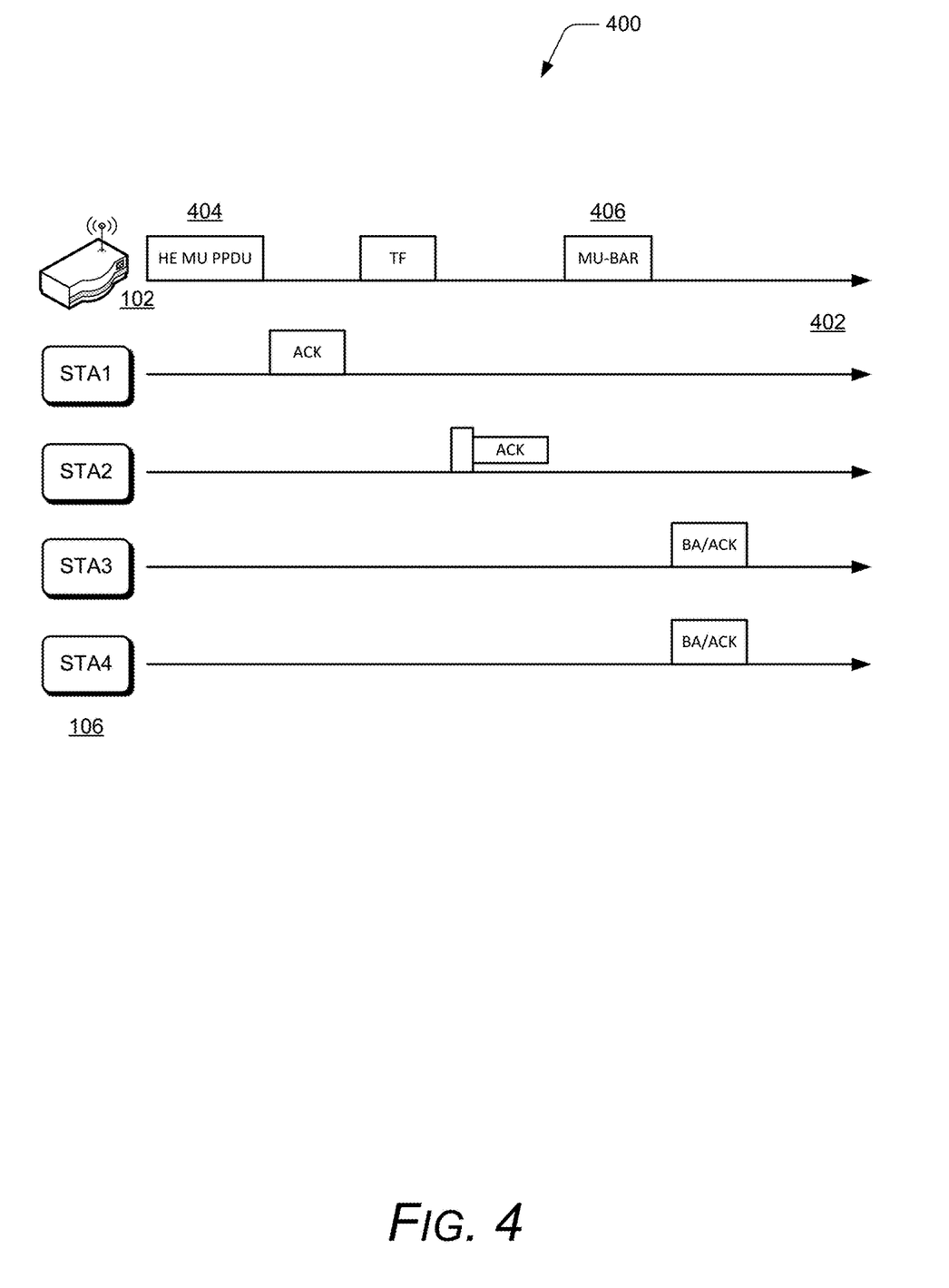
FIG. 4 illustrates an example technique of acknowledgement options for downlink multi-user transmission using polled uplink single user transmission mode with MU BAR (multi-user block acknowledgement request).

FIG. 4 illustrates an example 400 of acknowledgement options for downlink multi-user transmission using polled uplink single user (UL SU) transmission mode with MU BAR (multi-user block acknowledgement request). The example 400 includes a timeline 402 that shows the access point 102 implemented for HE MU PPDU 404 and a station device 106, STA2 that does not support uplink multi-user (UL MU) transmission and is a low-power station device (or at an extended communication range away from the access point). Generally, the station device 106, STA1 is implemented for single user (SU) sequential acknowledgement. The station devices 106, STA3 and STA4 support uplink multi-user (UL MU) transmission, in which case multi-user block acknowledgement request (MU-BAR) 406 can be used to solicit simultaneous BA/ACKs, such as in an uplink OFDMA message (OFDMA PPDU multi-user packet). This MU-BAR is a hybrid mode used to manage the different station devices 106, combining sequential acknowledgement and MU mode with defined block acknowledgement request frames use to indicate the solicitation of ACK, such as by using one of the reserved options in B1-B3 of the BAR control filed to signal an ACK request.

Figure 5:
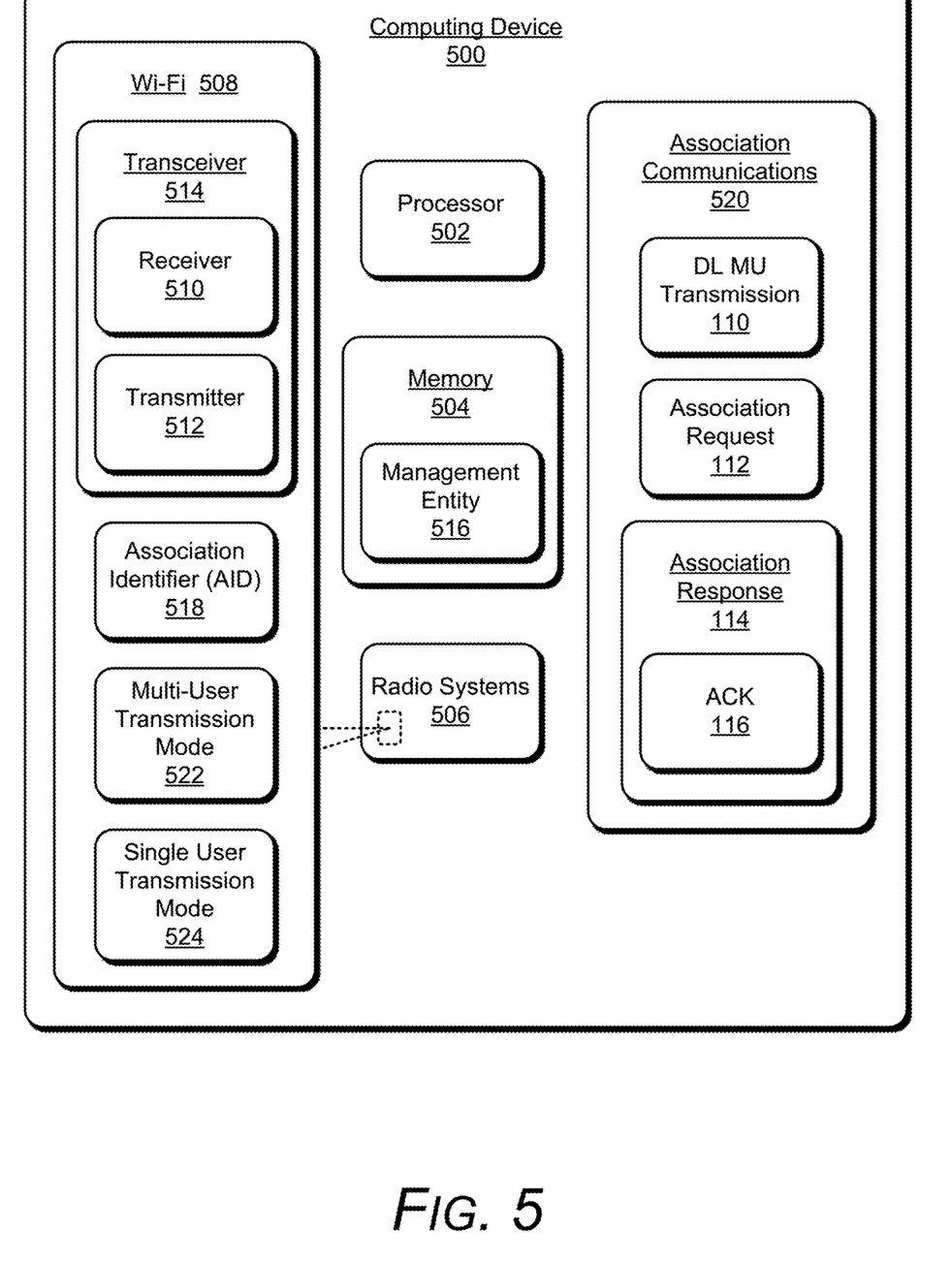
FIG. 5 illustrates an example computing device for aspects of acknowledgement options for downlink multi-user transmission.

FIG. 5 illustrates an example computing device 500 in which aspects of acknowledgement options for downlink multi-user transmission can be implemented. The example computing device 500 is representative of a computing device implemented for communication in a Wi-Fi network system, such as the station devices 106, or as the access point 102, as shown and described with reference to FIG. 1. The example device 500 may be implemented as any one or combination of a tablet computer, computing device, communication, entertainment, gaming, navigation, and/or other type of electronic or computing device. The computing device 500 can be implemented with various components, such as a processing system (e.g., the processor 502), memory 504, a power source (e.g., a battery for mobile devices) to power device components, and with any number and combination of different components as further described with reference to the example device shown in FIG. 8. The memory 504 can be implemented as any suitable memory device or electronic data storage in the computing device to store device and application data, as well as device applications, such as an operating system of the computing device.

As a communication-enabled device, the computing device 500 can include radio systems 506 implemented for data and voice communication. The different radio systems 506 may include, but are not limited to, a Wi-Fi system 508, Bluetooth™, Mobile Broadband, Long-Term Evolution (LTE), Near Field Communication (NFC), or any other wired or wireless communication system or format, configured for communication via respective LANs, WANs, and wireless networks. The Wi-Fi system 508 includes a receiver 510 and a transmitter 512, both of which may be implemented as integrated components of a transceiver 514.

Generally, the computing device 500 is implemented for IEEE 802.11 (Wi-Fi) compliance, such as for the new IEEE 802.11ax protocol for High Efficiency WLAN, with a media access control (MAC) and physical layer (PHY) interface for wireless communication. The MAC includes a management entity 516 that assigns the association identifier (AID) 518 for the association communications 520, such as between the access point 102 and the station devices 106.

The management entity 516 can be implemented as a software application or module, such as computer-executable software instructions that are executable with the processor 502 (or with a processing system) to implement aspects of acknowledgement options for downlink multi-user transmission as described herein. The management entity 516 can be stored on computer-readable storage memory (e.g., the device memory 504), such as any suitable memory device or electronic data storage implemented in the computing device. Although shown as a separate module or component in memory 504, the management entity 516 may be integrated as a module or component of the Wi-Fi system 508, or with any computer applications, such as an operating system of the computing device.

As noted above, the access point 102 as shown and described with reference to FIG. 1, may be implemented as the computing device 500 for wireless communication in a Wi-Fi network system. The transmitter 512 (e.g., a transmitter component of the transceiver 514 of the Wi-Fi system 508) can communicate the downlink multi-user (DL MU) transmission 110 soliciting acknowledgement from one or more of the station devices 106, such as shown and described with reference to FIG. 1. The DL MU transmission 110 can be communicated as a HE MU PPDU soliciting the acknowledgement from the one or more station devices. The receiver 510 (e.g., a receiver component of the transceiver 514 of the Wi-Fi system 508) can then receive association requests 112 from one or more of the station devices 106 that are within the communication range 104 of the access point 102 and respond to the downlink multi-user (DL MU) transmission 110.

The management entity 516 (e.g., of the access point 102) can determine an acknowledgement option for each of the station devices 106 that communicate an association request 112 to the access point 102, and then determine either a multi-user transmission mode 522 or a single user transmission mode 524 for each of the different station devices 106 based on the acknowledgement option determined for each of the respective station devices. For example, the management entity 516 can use the multi-user transmission mode 522 for a station device 106 that supports uplink multi-user (UL MU) transmission, where the multi-user transmission mode 522 uses polled uplink single user (UL SU) transmission mode with MU BAR (multi-user block acknowledgement request) to solicit the acknowledgement in an uplink OFDMA (Orthogonal Frequency-Division Multiple Access) message. Alternatively, the management entity 516 can use the single user transmission mode 524 for a station device 106 that does not support uplink multi-user (UL MU) transmission, where the single user transmission mode 524 is a polled uplink single user (UL SU) sequential transmission mode used to acknowledge the access point. The transmitter 512 can then communicate a corresponding QoS Ack Policy in a downlink data frame, and optionally in a polling frame, to each of the station devices 106 based on the determined acknowledgement option for each of the respective station devices.

In other aspects of acknowledgement options for downlink multi-user transmission, the management entity 516 (e.g., of the access point 102) can receive an indication from a station device as to which transmission mode the station device can utilize. For example, the receiver 510 can receive a notification from a station device 106 as to whether the station device can acknowledge the downlink multi-user (DL MU) transmission 110 using the multi-user transmission mode 522 or the single user transmission mode 524. The management entity 516 can then determine the acknowledgement option for the station device 106 based on the notification received from the station device. The management entity 516 may also allocate one of the multi-user transmission mode 522 or the single user transmission mode 524 to a station device 106 and, then based on communication range between the station device 106 and the access point 102, switch the transmission mode for the station device, such as to maximize bandwidth usage for an extended range of communication to maintain the communication link between the devices.

Generally, the Wi-Fi system 508 and the management entity 516 may be implemented and/or described in the general context of software, firmware, hardware (e.g., fixed logic circuitry), applications, modules, or any combination thereof. In some implementations, any of the components of the computing device 500, such as the processor 502, the memory 504, and the radio systems 506 may be implemented as a system-on-chip (SoC) in the computing device 500, such as described with reference to the example SoC shown in FIG. 6. Further, although the memory 504 is shown as a separate component in the computing device 500, the processor 502 (e.g., a microcontroller) can include the memory as a memory and processing system.

Figure 6:
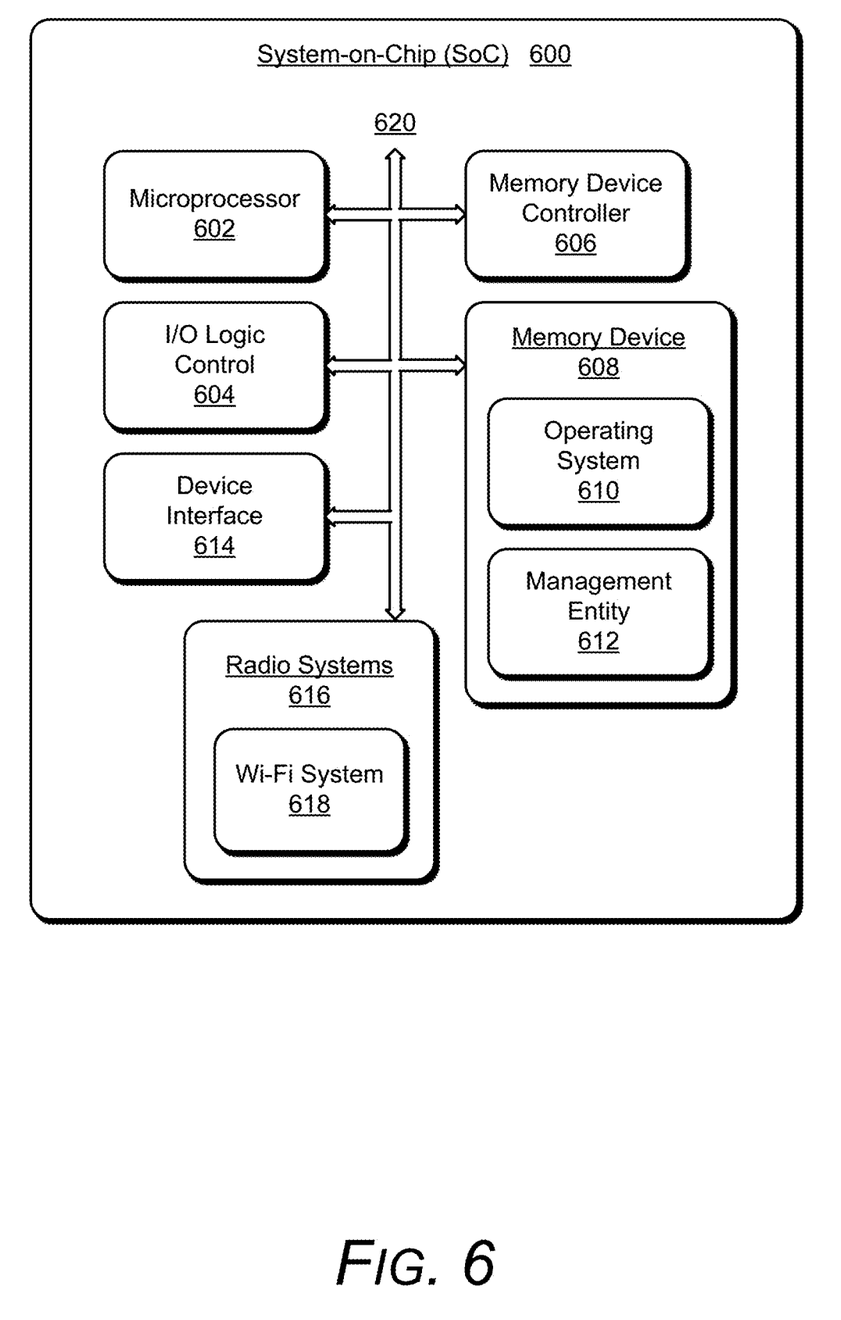
FIG. 6 illustrates an example system-on-chip (SoC) environment for aspects of acknowledgement options for downlink multi-user transmission.

FIG. 6 illustrates an example system-on-chip (SoC) 600, which can implement various aspects of acknowledgement options for downlink multi-user transmission. The example SoC may be implemented in any type of computing device, such as the computing device 500 described with reference to FIG. 5 that can be any type of computer, a tablet device, mobile phone, multimedia device, printer, or other computing and/or electronic device. The SoC 500 can be integrated with electronic circuitry, a microprocessor, memory, input-output (I/O) logic control, communication interfaces and components, as well as other hardware, firmware, and/or software to implement the computing device 500.

In this example, the SoC 600 is integrated with a microprocessor 602 (e.g., any of a microcontroller or digital signal processor) and input-output (I/O) logic control 604 (e.g., to include electronic circuitry). The SoC 600 includes a memory device controller 606 and a memory device 608, such as any type of a nonvolatile memory and/or other suitable electronic data storage device. The SoC 600 can also include various firmware and/or software, such as an operating system 610 and a management entity 612 that are maintained by the memory device 608 and executed by the microprocessor. The SoC 600 can also include a dynamic memory, which along with the microprocessor 602, can be implemented as a microcontroller on the SoC.

The SoC 600 includes a device interface 614 to interface with a device or other peripheral component, such as when installed in the computing device 500 as described herein. In this example, the SoC 600 also includes one or more radio systems 616, such as the radio systems 506 that are shown and described with reference to the computing device 500 in FIG. 5, to include a Wi-Fi system 618. Alternatively, the radio systems 616 can be implemented as hardware, in firmware, as fixed logic circuitry, or as any combination thereof that is implemented in connection with the I/O logic control 604 and/or other processing and control circuits of the SoC 600. The SoC 600 also includes an integrated data bus 620 that couples the various components of the SoC for data communication between the components. The data bus in the SoC may also be implemented as any one or a combination of different bus structures and/or bus architectures.

Example method 700 is described with reference to FIG. 7 in accordance with one or more aspects of acknowledgement options for downlink multi-user transmission. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and some implementations can include software applications, programs, functions, and the like. Alternatively or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 7:
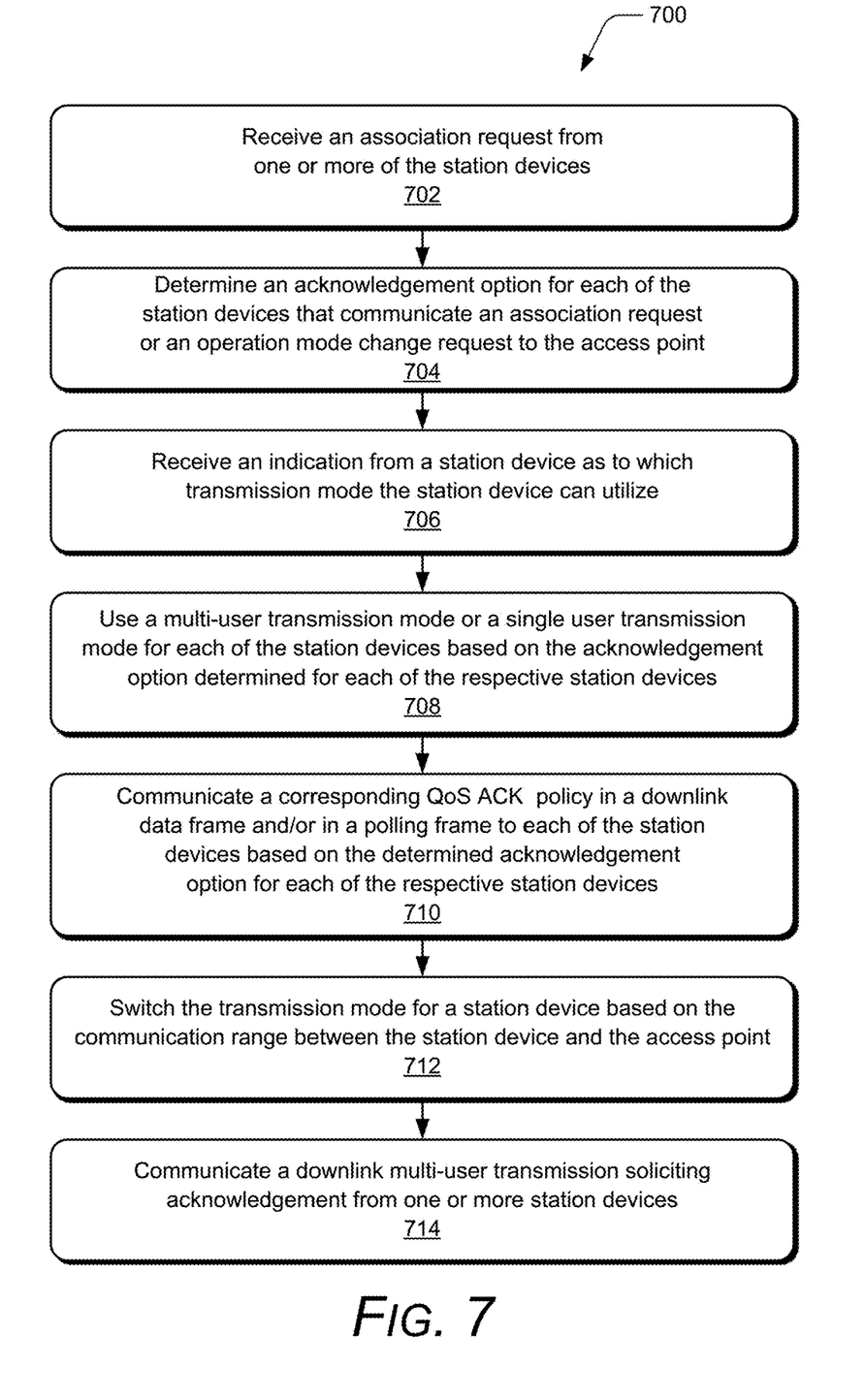
FIG. 7 illustrates an example method of acknowledgement options for downlink multi-user transmission.

FIG. 7 illustrates example method(s) 700 of acknowledgement options for downlink multi-user transmission, and is generally described with reference to the example system shown and described with reference to FIG. 1. The order in which the method is described is not intended to be construed as a limitation, and any number of the described method operations can be combined in any order to implement the method, or an alternate method.

At 702, an association request is received from one or more of the station devices. For example, the access point 102 receives an association request 112 from one or more of the station devices 106 that are within the communication range 104 of the access point 102 and respond to the downlink multi-user (DL MU) transmission 110.

At 704, an acknowledgement option is determined for each of the station devices that communicate an association request or an operation mode change request to the access point. For example, the management entity 516 implemented by the access point 102 determines an acknowledgement option for each of the station devices 106 that communicate an association request 112 or an operation mode change request to the access point.

At 706, an indication is received from a station device as to which transmission mode the station device can utilize. For example, the management entity 516 implemented by the access point 102 receives an indication from a station device 106 as to which transmission mode the station device can utilize, such as the multi-user transmission mode 522 or the single user transmission mode 524. The management entity 516 of the access point 102 can receive a notification from a station device 106 as to whether the station device can acknowledge the downlink multi-user transmission 110 using the multi-user transmission mode 522 or the single user transmission mode 524. The management entity 516 can then determine the acknowledgement option for the station device 106 based on the notification received from the station device.

At 708, a multi-user transmission mode or a single user transmission mode is used for each of the station devices based on the acknowledgement option determined for each of the respective station devices. Alternatively or in addition, the multi-user transmission mode or the single user transmission mode is determined for a station device that communicates an indication as to which transmission mode the station device can utilize (i.e., block 708). For example, the management entity 516 implemented by the access point 102 determines the multi-user transmission mode 522 or the single user transmission mode 524 for each of the station devices 106 based on the acknowledgement option determined for each of the respective station devices.

The multi-user transmission mode 522 is used for a station device 106 that supports uplink multi-user (UL MU) transmission, where the multi-user transmission mode 522 uses polled uplink single user (UL SU) transmission mode with MU BAR (multi-user block acknowledgement request) to solicit the acknowledgement in an uplink OFDMA (Orthogonal Frequency-Division Multiple Access) message. Alternatively, the single user transmission mode 524 is used for a station device 106 that does not support uplink multi-user (UL MU) transmission, where the single user transmission mode 524 is a polled uplink single user sequential transmission mode used to acknowledge the access point.

At 710, a corresponding QoS ACK Policy is communicated in a downlink data frame and/or in a polling frame to each of the station devices based on the determined acknowledgement option for each of the respective station devices. For example, the access point 102 communicates a corresponding QoS ACK Policy in a downlink data frame and/or in a polling frame to each of the station devices 106 based on the determined acknowledgement option for each of the respective station devices.

At 712, the transmission mode for a station device is switched based on the communication range between the station device and the access point. For example, the management entity 516 uses the multi-user transmission mode 522 or the single user transmission mode 524 for a station device 106 and, based on the communication range between the station device and the access point, the transmission mode for the station device is switched. In an implementation, the transmission mode can be switched from the multi-user transmission mode 522 to the single user transmission mode 524 to maintain the communication link between the access point 102 and the station device 106.

At 714, a downlink multi-user transmission is communicated soliciting acknowledgement from one or more station devices. For example, the access point 102 communicates the downlink multi-user transmission 110 soliciting acknowledgement from one or more of the station devices 106. The downlink multi-user transmission 110 is communicated as a high efficiency multi-user (HE MU) PPDU (PLCP (PHY Layer Convergence Procedure) Protocol Data Unit) soliciting the acknowledgement from the one or more station devices 106.

Figure 8:
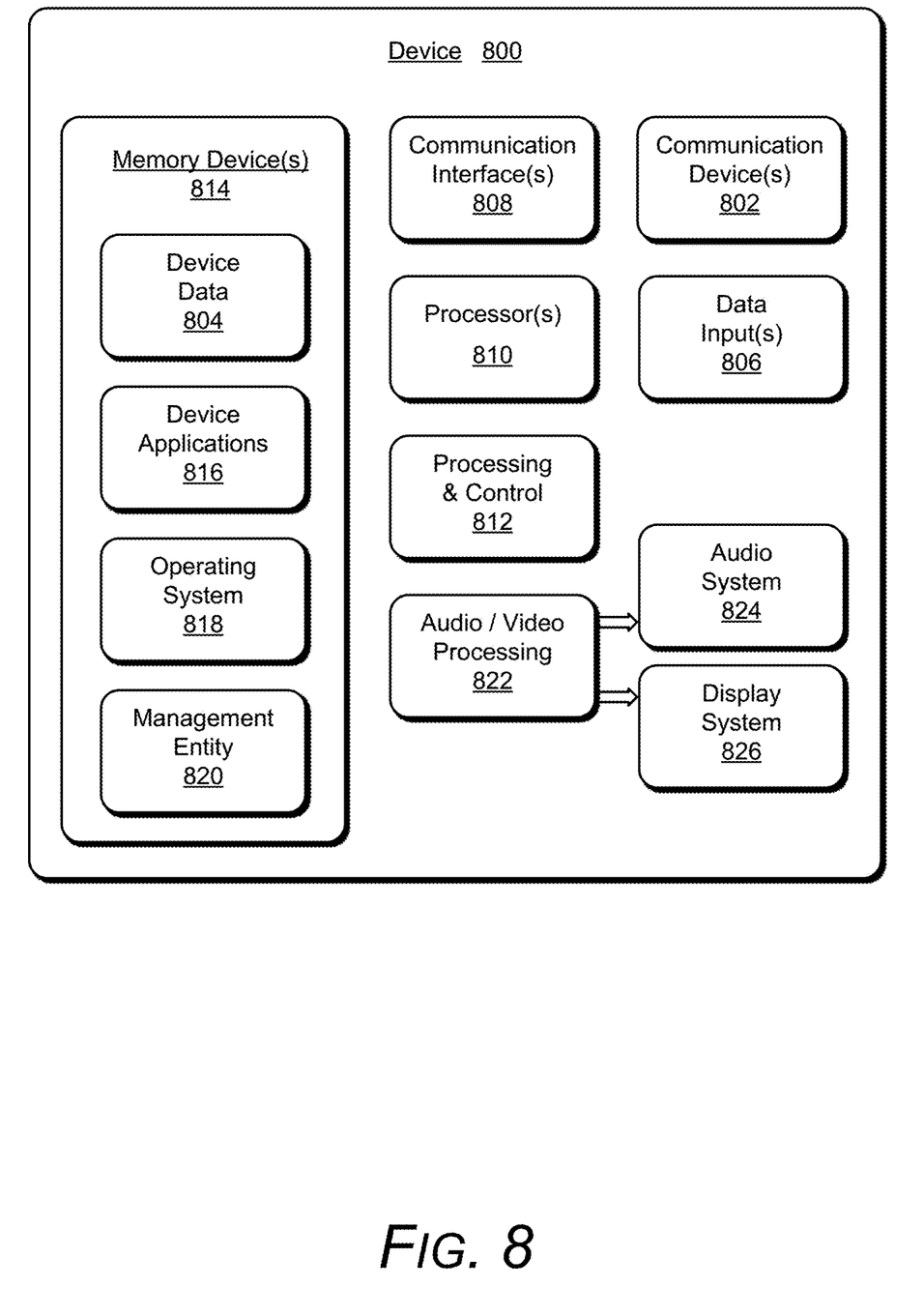
FIG. 8 illustrates various components of an example device that can implement aspects of acknowledgement options for downlink multi-user transmission.

FIG. 8 illustrates various components of an example device 800 that can be implemented as any of the devices or systems described with reference to the previous FIGS. 1-7, such as any type of a computing device 500 as described with reference to FIG. 5. The device 800 may also be implemented to include the example system-on-chip (SoC) described with reference to FIG. 6. The device 800 may be associated with a user (i.e., a person) and/or an entity that operates the device such that a device describes logical devices that include software, firmware, hardware, and/or a combination of devices.

The device 800 includes communication devices 802 that enable wired and/or wireless communication of device data 804, such as received data, data that is communicated between devices, data packets of the data, etc. The device 800 also includes one or more data inputs 806 via which any type of data, media content, and/or inputs can be received, such as user-selectable inputs and any other type of audio, video, and/or image data received from any content and/or data source. The data inputs 806 may include USB ports, coaxial cable, and other serial or parallel connectors (including internal connectors) for flash memory, DVDs, CDs, and the like. The data inputs can be used to couple the device to internal and/or external components, peripherals, and accessories, such as keyboards, microphones, cameras, and any other types of devices.

The device 800 also includes communication interfaces 808, such as any one or more of a serial, parallel, network, or wireless interface. The communication interfaces provide a connection and/or communication links between the device and a network by which other electronic, computing, and communication devices communicate data with the device. Although not shown, the device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 800 includes one or more processors 810 (e.g., any of microprocessors, controllers, and the like), or a processor and memory system (e.g., implemented in an SoC), which processes computer-executable instructions to control the operation of the device. Alternatively or in addition, the device 800 can be implemented with any one or combination of software, hardware, firmware, or fixed logic circuitry that is implemented in connection with processing and control circuits which are generally identified at 812.

The device 800 also includes one or more memory devices 814 (e.g., computer-readable storage memory) that enables data storage, such as random access memory (RAM), nonvolatile memory (e.g., read-only memory (ROM), flash memory, etc.), and a disk storage device. The memory devices 814 can be accessed by a computing device, and provide persistent storage of data and executable instructions (e.g., software applications, modules, programs, functions, and the like). A disk storage device may be implemented as any type of magnetic or optical storage device, such as a hard disk drive, a recordable and/or rewriteable disc, and the like. The device may also include a mass storage media device. Computer-readable storage memory can be any suitable electronic data storage in various memory device configurations that are accessed by a computing device.

A memory device 814 provides data storage to store the device data 804, other types of information and/or data, and device applications 816. For example, an operating system 818 can be maintained as a software application with the memory device and executed by a processor 810. The device applications may also include a device manager or controller, such as any form of a control application, software application, signal processing and control module, code that is native to a particular device, a hardware abstraction layer for a particular device, and so on. In this example, the device 800 also includes a management entity 820 of a Wi-Fi system, such as when the device 800 is implemented as the access point 102 or as the station device 106, as shown and described with reference to the previous FIGS. 1-7.

The device 800 may also include an audio and/or video processing system 822 that generates audio data for an audio system 824 and/or generates display data for a display system 826. The audio system and/or the display system may include any devices that process, display, and/or otherwise render audio, video, display, and/or image data. In implementations, the audio system and/or the display system are external components to the device. Alternatively, the audio system and/or the display system are integrated components of the example device.

Further aspects of the present invention relate to one or more of the following clauses. An access point implemented for wireless communication comprises a transmitter component configured to communicate a downlink multi-user transmission soliciting acknowledgement from one or more station devices; a receiver component configured to receive an association request from one or more of the station devices; a management entity configured to: determine an acknowledgement option for each of the one or more station devices that communicate packets to the access point; and determine a multi-user transmission mode or a single user transmission mode for each of the one or more station devices based on the acknowledgement option determined for each of the one or more station devices.

The downlink multi-user transmission is a high efficiency multi-user (HE MU) PPDU (PLCP (PHY Layer Convergence Procedure) Protocol Data Unit) soliciting the acknowledgement from the one or more station devices. The management entity is configured to allocate a resource unit to a station device that supports uplink multi-user transmission, and the multi-user transmission mode uses polled uplink single user transmission mode with MU BAR (multi-user block acknowledgement request) to solicit the acknowledgement in an uplink OFDMA (Orthogonal Frequency-Division Multiple Access) message. The management entity is configured to communicate in the single user transmission mode to a station device that does not support uplink multi-user transmission, and the single user transmission mode is a polled uplink single user sequential transmission mode used to acknowledge the access point. The management entity receives an indication from a station device as to which transmission mode the station device can utilize. The receiver component is configured to receive a notification from a station device as to whether the station device can acknowledge the downlink multi-user transmission using the multi-user transmission mode or the single user transmission mode; and the management entity is configured to determine the acknowledgement option for the station device based on the notification received from the station device. The transmitter component is configured to communicate a corresponding QoS Ack Policy in at least one of a downlink data frame and a polling frame to each of the one or more station devices based on the determined acknowledgement option for each of the respective station devices. The management entity is configured to use one of the multi-user transmission mode or the single user transmission mode for a station device and, based on communication range between the station device and the access point, switch the transmission mode for the station device to transmit the acknowledgement.

A method is implemented by an access point in a wireless communication network, the method comprising communicating a downlink multi-user transmission soliciting acknowledgement from one or more station devices; receiving an association request from one or more of the station devices; determining an acknowledgement option for each of the one or more station devices that communicate an association request or an operation mode change request to the access point; and determining a multi-user transmission mode or a single user transmission mode for each of the one or more station devices based on the acknowledgement option determined for each of the one or more station devices.

The communicating the downlink multi-user transmission is a high efficiency multi-user (HE MU) PPDU (PLCP (PHY Layer Convergence Procedure) Protocol Data Unit) soliciting the acknowledgement from the one or more station devices. The method further comprises using the multi-user transmission mode for a station device that supports uplink multi-user transmission, to include the multi-user transmission mode using polled uplink single user transmission mode with MU BAR (multi-user block acknowledgement request) to solicit the acknowledgement in an uplink OFDMA (Orthogonal Frequency-Division Multiple Access) message. The method further comprises using the single user transmission mode for to a station device that does not support uplink multi-user transmission, to include the single user transmission mode being a polled uplink single user sequential transmission mode used to acknowledge the access point. The method further comprising receiving an indication from a station device as to which transmission mode the station device can utilize. The method further comprising receiving a notification from a station device as to whether the station device can acknowledge the downlink multi-user transmission using the multi-user transmission mode or the single user transmission mode; and determining the acknowledgement option for the station device based on the notification received from the station device. The method further comprising communicating a corresponding QoS ACK Policy in at least one of a downlink data frame and a polling frame to each of the one or more station devices based on the determined acknowledgement option for each of the respective station devices, and using one of the multi-user transmission mode or the single user transmission mode for a station device and, based on communication range between the station device and the access point, switching the transmission mode for the station device.

A wireless network system comprises a station device configured to: detect a downlink multi-user transmission soliciting acknowledgement that is communicated in the wireless network system; and communicate an association request to join the wireless network system. The wireless network system also comprises an access point configured to: determine an acknowledgement option for the station device; and determine a multi-user transmission mode or a single user transmission mode for the station device based on the acknowledgement option determined for the station device.

The access point is configured to one of: use the multi-user transmission mode for the station device to transmit back the acknowledgement simultaneously if the station device supports uplink multi-user transmission, the multi-user transmission mode using polled uplink single user transmission mode with MU BAR (multi-user block acknowledgement request) to solicit the acknowledgement in an uplink OFDMA (Orthogonal Frequency-Division Multiple Access) message; or use the single user transmission mode for the station device if the station device does not support uplink multi-user transmission, the single user transmission mode being a polled uplink single user sequential transmission mode used to acknowledge the access point.

Although aspects of acknowledgement options for downlink multi-user transmission have been described in language specific to features and/or methods, the appended claims are not necessarily limited to the specific features or methods described. Rather the specific features and methods are disclosed as example implementations of acknowledgement options for downlink multi-user transmission, and other equivalent features and methods are intended to be within the scope of the appended claims. Further, various different aspects are described and it is to be appreciated that each described aspect can be implemented independently or in connection with one or more other described aspects.

What is claimed is:

1. A method implemented by an access point of a wireless communication network, the method comprising:
   determining, based on communication with multiple station devices that include at least a first station device and a second station device, that the second station device is not able to utilize a multi-user transmission mode to communicate with the access point;
   communicating, to the multiple station devices, a downlink multi-user transmission soliciting acknowledgement from the first station device of the multiple station devices;
   receiving, in response to the downlink multi-user transmission, a first acknowledgement from the first station device;
   transmitting, after a short interframe space (SIFS) time following reception of the first acknowledgement from the first station device, a trigger frame soliciting acknowledgement from the second station device of the multiple station devices; and
   receiving, in response to the trigger frame that is transmitted after the SIFS time following the reception of the first acknowledgement, a second acknowledgement from the second station device that is transmitted by the second station device as an uplink single-user transmission, the second acknowledgement received after at least a SIFS time following the transmission of the trigger frame.

2. The method as recited in claim 1, wherein the first acknowledgement received from the first station device is transmitted by the first station device as an uplink single-user transmission.

3. The method as recited in claim 1, wherein:
the downlink multi-user transmission soliciting acknowledgement comprises a high efficiency multi-user (HE MU) PPDU (PLCP (PHY layer convergence procedure) protocol data unit); and
the method further comprises transmitting, after reception of the second acknowledgement from the second station device, a downlink multi-user block acknowledgement request to at least one other station device.

4. The method as recited in claim 3, further comprising receiving, in response to the downlink multi-user block acknowledgement request, a third acknowledgement from a third station device, the third acknowledgement transmitted by the third station device as an uplink multi-user transmission.

5. The method as recited in claim 1, wherein the trigger frame is a second trigger frame and downlink multi-user transmission soliciting acknowledgement from the first station device comprises an HE PPDU with which a first trigger frame is aggregated to solicit the acknowledgement from the first station device.

6. The method as recited in claim 1, wherein:
the trigger frame is a second trigger frame;
the downlink multi-user transmission soliciting acknowledgement from the first station device is a first trigger frame; and
the method further comprises transmitting, prior to transmission of the first trigger frame, an HE PPDU to the multiple station devices, the first trigger frame being transmitted after a SIFS time following transmission of the HE PPDU.

7. The method as recited in claim 1, further comprising determining, based on the communication with the multiple station devices, that the first station device is not able to utilize a multi-user transmission mode to communicate with the access point.

8. An apparatus implemented for wireless communication, the apparatus comprising:
a transmitter component configured to transmit respective data to a plurality of station devices that include at least a first station device and a second station device;
a receiver component configured to receive other respective data from the plurality of station devices;
a management entity configured to:
determine, based on communication with the plurality of station devices, that the second station device is not able to utilize a multi-user transmission mode to communicate with the apparatus;
communicate, to the plurality of station devices, a downlink multi-user transmission soliciting acknowledgement from the first station device of the plurality of station devices;
receive, in response to the downlink multi-user transmission, a first acknowledgement from the first station device;
transmit, after a short interframe space (SIFS) time following reception of the first acknowledgement from the first station device, a trigger frame soliciting acknowledgement from the second station device of the plurality of station devices; and
receive, in response to the trigger frame that is transmitted after the SIFS time following the reception of the first acknowledgement, a second acknowledgement from the second station device that is transmitted by the second station device as an uplink single-user transmission, the second acknowledgement received after at least a SIFS time following the transmission of the trigger frame.

9. The apparatus as recited in claim 8, wherein the first acknowledgement received from the first station device is transmitted by the first station device as an uplink single-user transmission.

10. The apparatus as recited in claim 8, wherein the management entity is further configured to:
transmit, after reception of the second acknowledgement from the second station device, a downlink multi-user block acknowledgement request to at least one other station device; and
receive, in response to the downlink multi-user block acknowledgement request, a third acknowledgement from a third station device, the third acknowledgement transmitted by the third station device as an uplink multi-user transmission.

11. The apparatus as recited in claim 8, wherein the trigger frame is a second trigger frame and downlink multi-user transmission soliciting acknowledgement from the first station device comprises an HE PPDU with which a first trigger frame is aggregated to solicit the acknowledgement from the first station device.

12. The apparatus as recited in claim 8, wherein the trigger frame is a second trigger frame, the downlink multi-user transmission soliciting acknowledgement from the first station device is a first trigger frame, and the management entity is further configured to transmit the first trigger frame following a transmission of an HE PPDU to the plurality of station devices, the first trigger frame being transmitted after a SIFS time following the HE PPDU.

13. The apparatus as recited in claim 8, wherein the management entity is further configured to determine, based on the communication with the plurality of station devices, that the first station device is not able to utilize a multi-user transmission mode to communicate with the apparatus.

14. A system-on-chip for wireless communication, the system-on-chip comprising:
a transmission controller configured to transmit data via a wireless medium;
a receiving controller configured to receive other data via the wireless medium;
a communication controller configured to:
determine, based on communication with multiple station devices that include at least a first station device and a second station device, that the second station device is not able to utilize a multi-user transmission mode to communicate with the access point;
communicate, to the multiple station devices, a downlink multi-user transmission soliciting acknowledgement from the first station device of the multiple station devices;
receive, in response to the downlink multi-user transmission, a first acknowledgement from the first station device;
transmit, after a short interframe space (SIFS) time following reception of the first acknowledgement from the first station device, a trigger frame soliciting acknowledgement from the second station device of the multiple station devices; and receive, in response to the trigger frame that is transmitted after the SIFS time following the reception of the first acknowledgement, a second acknowledgement from the second station device that is transmitted by the second station device as an uplink single-user transmission, the second acknowledgement received after at least a SIFS time following the transmission of the trigger frame.

15. The system-on-chip as recited in claim 14, wherein the first acknowledgement received from the first station device is transmitted by the first station device as an uplink single-user transmission.

16. The system-on-chip as recited in claim 14, wherein the communications controller is further configured to transmit, after reception of the second acknowledgement from the second station device, a downlink multi-user block acknowledgement request to at least one other station device.

17. The system-on-chip as recited in claim 14, wherein the trigger frame is a second trigger frame and the downlink multi-user transmission soliciting acknowledgement from the first station device comprises an HE PPDU with which a first trigger frame is aggregated to solicit the acknowledgement from the first station device.

18. The system-on-chip as recited in claim 17, wherein the first trigger frame that is aggregated with the HE PPDU is transmitted after a SIFS time that follows the HE PPDU.

19. The system-on-chip as recited in claim 14, wherein the communications controller is further configured to determine, based on the communication with the multiple station devices, that the first station device is not able to utilize a multi-user transmission mode to communicate with the access point.

20. The system-on-chip as recited in claim 14, wherein:
the trigger frame is a second trigger frame, the downlink multi-user transmission soliciting acknowledgement from the first station device is a first trigger frame; and
the communications controller is further configured to transmit the first trigger frame following a transmission of an HE PPDU to the multiple station devices.

* * * * *